United States Patent [19]

Garnett et al.

[11] 4,302,522

[45] Nov. 24, 1981

[54] METHOD OF MAKING POLYMERIC PHOTOCONDUCTIVE MATERIAL INVOLVES PARTIAL POLYMERIZATION STEP

[76] Inventors: John L. Garnett, 29 Arabella St., Longueviile, New South Wales; John D. Rock, 12 Kara St., Lane Cove, New South Wales, both of Australia, 2066

[21] Appl. No.: 144,260

[22] Filed: Apr. 28, 1980

Related U.S. Application Data

[63] Continuation of Ser. No. 940,195, Sep. 7, 1978, abandoned, which is a continuation of Ser. No. 731,452, Oct. 12, 1976, abandoned, which is a continuation of Ser. No. 541,947, Jan. 17, 1975, abandoned.

[30] Foreign Application Priority Data

Jan. 21, 1974 [AU] Australia .............................. PB6318

[51] Int. Cl.³ .............................................. G03G 5/07
[52] U.S. Cl. ...................................... 430/133; 430/135; 430/79; 430/935; 430/96; 427/54.1; 427/44
[58] Field of Search .................... 430/135, 133, 79, 80, 430/81, 96, 315, 319, 905, 935, 942, 127, 130; 427/54

[56] References Cited

U.S. PATENT DOCUMENTS 3,155,503  11/1964  Cassiers et al. ...................... 430/97

Primary Examiner—John D. Welsh
Attorney, Agent, or Firm—Holman & Stern

[57] ABSTRACT

A method of rendering a surface of substrate photoconduction comprising applying to the substrate a layer of N-vinyl carbazole and a prepolymer formed thereupon and completely polymerizing the monomer or prepolymer in situ on the substrate.

7 Claims, No Drawings

METHOD OF MAKING POLYMERIC PHOTOCONDUCTIVE MATERIAL INVOLVES PARTIAL POLYMERIZATION STEP

This is a continuation of application Ser. No. 940,195, filed Sept. 7, 1978 abandoned, which in turn is a Cont. of U.S. Ser. No. 731,452 filed Oct. 12, 1976, which is in turn a Cont. of Ser. No. 541,947 filed Jan. 17, 1975, both now abandoned.

BACKGROUND AND SUMMARY OF THE INVENTION

The present invention relates to photoconductive materials and to methods for their production, more particularly the invention relates to the polymerization of monomers or prepolymers to yield photoconductive polymers.

Currently used electrographic materials consist of a support and a photoconductive layer containing as photoconductor selenium or zinc oxide. Organic substances such as anthracene, benzidine or certain types of heterocyclic compounds are known to be used instead of the abovementioned inorganic materials.

Electrostatic recording materials have also been reported. These consist of a photoconductive layer such as antimony trichloride covered with an insulating layer of polymer such as polystyrene.

It is also known that certain polymers can also retain in the dark a high electric discharge for a period of time, but lose this charge on exposure to electromagnetic radiation of suitable wavelength.

In all of this prior art, adhesion of the photoconductive material to the surface of a substrate can be a severe limitation to the application of the technique. Some of the known photoconductive polymers are difficult to coat onto suppports due to their high molecular weight. It is also time consuming to prepare the polymer in a separate step.

The present invention consists in a photoconductive medium comprising a substrate having adhered to a surface thereof a layer of a polymeric material formed in situ on the substrate by the complete polymerization of one or more monomers selected from the group having the formula:

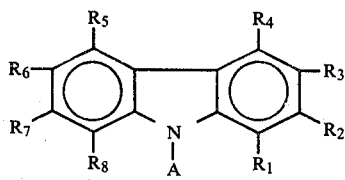

wherein A is a vinyl group, a hydrogen atom or an alkyl group containing up to 7 carbon atoms and R1, R2, R3, R4, R5, R6, R7 and R8 are each selected from the group comprising a hydrogen atom, a halogen atom and a vinyl group, with the proviso that when A is a hydrogen atom or a lower alkyl group at least one of R1, R2, R3, R4, R5, R6, R7 and R8 is a vinyl group, or by the complete polymerisation of one or more prepolymers formed by the partial polymerisation of one or more of the said monomers.

In a further aspect the present invention consists in a method of rendering a surface of a substrate photoconductive, comprising the steps of applying to the surface a layer of one or more monomers selected from the group having the formula:

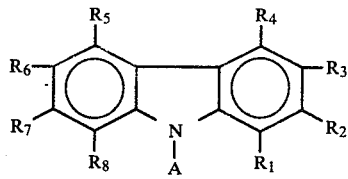

Wherein A is a vinyl group, a hydrogen atom or an alkyl group containing up to 7 carbon atoms and R1, R2, R3, R4, R5, R6, R7 and R8 are each selected from the group comprising a hydrogen atom, a halogen atom and a vinyl group, with the proviso, that when A is a hydrogen atom or a lower alkyl group at least one of R1, R2, R3, R4, R5, R6, R7 and R8 is a vinyl group, or applying to the surface a single layer of one or more prepolymers formed by the partial polymerisation of one or more of the said monomers, and polymerising the monomer(s) or prepolymer(s) completely in situ on the surface of the substrate.

For the purpose of this invention, grafting can be achieved by thermal, free radical or radiation-initiated means. Suitable radiation sources include ultra violet lamps and ionizing radiation sources such as cobalt-60, electron accelerators and Van der Graaff Generators. Ultraviolet initiation is particularly attractive since, with a suitable lamp, the polymerisation is completed within a fraction of a second and thus it is feasible to include a U.V. source within a Xerographic or Xeroradiographic machine to polymerise a monomer coated onto a support within the machine and to simultaneously graft the polymer to the support. "Imaging" being achieved in a subsequent step within the same machine.

As a guide to "imaging" properties of the present polymers, the ratio of the photoconductivity to the dark current is useful. There appears to be a threshold value which must be achieved to attain "imaging". Above this threshold value, any increase does not appear to affect the "imaging". The fact that finite photoconductivity dark current ratios can be induced into supports by the present technique is also of interest since, although such values may not reach the threshold required to give imaging, the induced property can be of use in some applications.

DESCRIPTION OF THE PREFERRED EMBODIMENTS

The types of monomers that have been converted into polymers and simultaneously grafted in situ by the present technique are the N-vinylcarbazoles, the N-lower alkylcarbazoles and substituted alkylcarbarzoles such as the mono- and dibromo-derivatives. These compounds have the following formula:

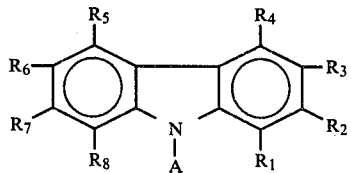

Wherein A is a vinyl group, a hydrogen atom or an alkyl, group containing up to 7 carbon atoms and R1, R2, R3, R4, R5, R6, R7 and R8 are each selected from the group comprising a hydrogen atom, a halogen atom and a vinyl group, with the proviso that when A is a hydrogen atom or a lower alkyl group at least one of R1, R2, R3, R4, R5, R6, R7 and R8 is a vinyl group. Examples of N-lower alkyl-carbarzoles are 2-vinyl-N-Methylcarbazole, 3 vinyl-N-Methylcarbazole, 2 vinyl-N-ethylcarbazole and 3-vinyl-N-ethylcarbazole. Alkyl groups up to n-heptyl may be substituted in the rings or on the nitrogen atom.

Mixtures and copolymers of the polymerised vinylcarbazoles with other monomers and polymers may also be used. Monomers that have been used in this work to form photoconducting copolymers with the vinylcarbazoles and related materials are the acrylates (butyl is fastest), substituted acrylates such as ethylhexyl acrylate, methacrylates substituted methacrylates, such as methyl methacrylate, vinyl halides, vinylidene halides, acrylonitrile, acrylic acid, olefin acetates (vinyl preferred) vinylpyrrolidone, styrene and substituted styrenesα-methylstyrene isoprene, vinylpyridines, olefins, vinylethers, vinylnaphthalenes, acrolein, alkyl isothiocyanate, vinylsilanes, acrylamide, dimethacrylamide, divinylbenzene and allylamine. The preferred monomers are butyl acrylate, acrylonitrile, vinylacetate, isoprene, vinylidene chloride, styrene, -methylstyrene, acrylamide, 5-nitroacenaphthene, the 2- and 4-vinylpyridines and 2-methyl-5-vinylpyridine.

In addition to the vinylcarbazoles, other compounds capable of producing photoconductive layers have also been included in photoconductive materials produced by the present invention. These include the polycyclic aromatic hydrocarbons, e.g. naphthalene, anthracene, pyrene, the terphenyls, chrysene, the quinolines, adridine, biphenyl and the benzidines. Further materials which may speed up polymerisation or improve the properties of the final product such as 2, 4, 7-trinitro-9-fluorenone can also be added during or after the copolymerisation stage.

The addition of non-vinyl carbazole monomers or polymers to the mixture can be used to improve the adhesion of the coating to the substrate or to improve the weathering or handling properties of the coating. Care must be exercised in the amount of such non-vinyl carbazole compounds added to the reaction mixture since their addition invariably reduces the imaging properties of the coating formed. The use of these additives represents a compromise between improved adhesion and poorer imaging. Paper has been used as the predominant support in the studies leading to the present invention however the above polymers have also been successfully polymerised onto a wide range of substrates including cardboard; metals such as aluminum, copper, tinplate, zinc coated steel, brass and lead, polystyrene, polyurethane; poly(methylmethacrylate); and polyolefins such as polypropylene and polyethylene.

It has been found desirable to polymerise the monomers in situ when using absorbent supports such as paper, however it can be desirable to form a partial prepolymer in order to ensure that the coating has a suitable viscosity at the time of application to the support. Coatings formed by the complete curing of a partial prepolymer in situ on a substrate gives improved imaging compared with the in situ polymerisation of the monomer or monomers from which the prepolymer was formed.

With the polyvinylcarbazoles, particularly N-vinylcarbazoles thermal, UV and radiation-induced methods can be used for grafting; the radiation-induced methods have been the most successful. Of the two radiation-induced techniques, the UV procedure appears to be the most useful presumably because surface grafting occurs predominantly.

If a solvent is required for the process with these monomers, pyridine, benzine, α, β and γ-picolines, dimethylformamide, nitrobenzene, pyrrolidine, tetrahydropyridine, piperidine, tetrahydrofuran, 1, 2 dichloroethane and chlorobenzene may be used however pyridine, the α- and γ-picolines, and benzene are preferred.

A further aspect of the present invention is that both the photoconductive/dark current ratios and the "imaging" property can be enhanced by the addition of additives capable of forming charge transfer complexes before, during or after the grafting reaction. These additives include the mineral acids such as sulphuric, hydrochloric, perchloric and to a lesser extent nitric acids. Salts of cadmium, mercury and zinc, particularly the chlorides and sulphates when soluble are also useful additives.

To achieve imaging the monomer of prepolymer is most preferably applied in a single coat; if successive coats are applied the upper coats appear to leak away the images. The coat is preferably of a thickness of from 0.02 to 0.5 thousandths of an inch. On metals coatings of 0.05 to 0.2 thousandths of an inch are preferred. The presence of additives can alter the preferred thickness ranges.

When the coating is applied to paper it is difficult to accurately measure the coating thickness and coating thickness is best expressed as a weight % graft. The type of paper also influences the preferred coating thickness. Whatman No: 41 chromatography paper, which is a pure cellulose showed optimum imaging at from 3 to 14%; satisfactory imaging being shown between 2 and 25% graft. Eatons Eminence bond paper showed satisfactory imaging between 1 and 12% with optimum performance between 2 and 8%. Generally a higher weight % graft is required when a monomer is used as the coating material, that when a prepolymer is used. This is presumably due to the lower viscosity of the monomer permitting it to diffuse into the paper.

Representative data explaining the invention further are shown in the attached Tables and Examples.

EXAMPLE 1

Preparation of a Vinyl Carbazole Prepolymer

Vinyl Carbazole (20 g) benzoin ethyl ether (2 g) and benzophenone (2 g) were dissolved in benzene (50 ml) and irradiated with U.V. light until the viscosity significantly increased as indicated by the slowing down of a magnetic stirrer (12 hours at room temperature). The radiation was provided by a 130 w. U.V. lamp placed at a distance of 13 cm from the reaction mixture. The time of irradiation was shortened to 1-2 hours when the reaction mixture was heated to 60° C. during irradiation; under these conditions it is preferred to carry out the prepolymerisation under a nitrogen blanket to minimise darkening of the mixture.

The prepolymer formed as described above was cured by the addition of 10% by volume of benzoin ethyl ether and 10% by volume of benzophenone and the U.V. curing of coatings sprayed onto cellulose. The U.V. radiation was provided by 1 minutes exposure to a 200 w/inch U.V. lamp at a distance of 5 cm. Curing was also obtained using an dectron bear in which case the U.V. sensitizers were omitted.

EXAMPLE 2

Preparation of Vinylcarbazole-Cellulose Copolymers by U.V. Initiation and Their Use in Xerography A solution (concentration depending on viscosity needed) of N-vinylcarbazole in pyridine containing benzophenone (20%) and benzoin ethyl ether (20%) was sprayed onto cellulose (Watman 41) until the required weight increase was obtained and exposed to a Woten HBO 200 w/2 L2 UV Lamp at a distance of 5 cm for several minutes until the film was cured (large lamps give fraction of a second cure times.). When a graft of 30% has been achieved (i.e. 30% increase in weight of the cellulose) the grafted paper is then checked for induced photoconductivity by checking the photoconductivity/dark current ratio by exposing the graft to white light and measuring the induced current formed (1). When the source is removed, the current remaining is termed the dark current (2). The ratio of (1):(2) for the above graft was 600/1. The light source used here was a quartz iodine lamp with bias voltage 12 v and measurements were in dry air. The paper was then checked for imaging by giving the dry coating a negative electric charge via a corona discharge produced by charging apparatus maintained at 6000 volts. It is then exposed to light of a definite wave length and the image developed with a positive developer.

A 30% solution of vinylcarbazole in pyridine was prepared and a strip of paper (3"×$\frac{1}{2}$") placed in the solution which was irradiated to 5 Mrads with gamma rays from a cobalt-60 source at 100,000 rads/hr. A graft of 10% was achieved with a photoconductivity/dark current ratio of 2.4 determined as in Example 1. This value was too low to give an image when using the method as in Example 1.

TABLE 1

Induced Photoconductivity in Cellulose[a] by Grafting of N-Vinylcarbazole and Derivatives

| Run | Polymerisation Method | Monomer | Solvent | Acid | Radiation Dose (MRad) | Graft (%) | Photocond./ Dark Current Ratio | Image |
|---|---|---|---|---|---|---|---|---|
| 1 | 130° | N-vinyl-carbazole | Pyridine | 0 | 0 | 8 | 6.0 | 0 |
| 2 | γ-irradiation | N-vinyl-carbazole (30% conc. in solvent) | " | 0 | 1 | 9 | 1.6 | 0 |
| 3 | " | N-vinyl-carbazole (30% conc. in solvent) | " | 0 | 5 | 26 | 6.0 | 0 |
| 4 | " | 3,6-dibromo vinyl carbazole | " | 0 | 1 | 22 | 5.5 | 0 |
| 5 | " | 3,6-dibromo vinyl carbazole | " | 0 | 5 | 18 | 8.6 | 0 |
| 6 | " | N-vinyl-carbazole | " | 0.1N | 1 | 14 | 1.3 | 0 |

[a]Whatman 41 paper

Notes:
1. The dibromocarbazole grafts more efficiently than vinylcarbazole with ionizing radiation, however the resulting papers are brown with the dibromo derivative suggesting decomposition during irradiation and poor application for Xerography. The photoconductivity/dark current ratios are also slightly higher for the dibromo material.
2. None of the samples in the Table gave an image despite showing photoconduction.
3. The sample prepared by thermal means (Run (1)) was also very brown, showing decomposition.
4. The appearance of the vinylcarbazole grafts was satisfactory.

TABLE 2

Induced Photoconductivity in Cellulose[c] by γ-Irradiation Grafting of N-vinylcarbazole and derivatives in Pyridine

| Run | Monomer | Conc (%) | Radiation Dose (Mrad) | Additive[a] | Graft (%) | Photocond. Dark Current Ratio | Image |
|---|---|---|---|---|---|---|---|
| 1 | N-vinylcarbazole | 10 | 1.5 | 0 | 6 | 13 | 0 |
| 2 | " | " | " | As in (1) + TNF/MeOH[b] | " | 11 | 0 |
| 3 | " | " | 2 | 0 | 5 | 9.4 | 0 |
| 4 | " | " | " | As in (3) + TNF/MeOH | " | 7.0 | 0 |
| 5 | " | 20 | 0.5 | 0 | 10 | 14 | 0 |
| 6 | " | " | " | As in (5) + TNF/Benzene (10% MeOH) | " | 20 | 0 |
| 7 | " | 30 | " | 0 | 11 | 8.2 | 0 |
| 8 | " | " | " | As in (7) + 5NA/Benzene | " | 12 | 0 |
| 9 | Dibromovinyl carbazole | 20 | 2 | 0 | 30 | 25 | 0 |
| 10 | " | " | " | As in (9) + H$_2$SO$_4$(0.1M) + TNF/MeOH | " | 15 | 0 |
| 11 | " | 30 | 2.5 | 0 | " | 68 | |
| 12 | " | " | " | As in (11) + TNF/Benzene (10% MeOH) | " | 55 | |
| 13 | " | 10 | 1 | 0 | 17 | 141 | |
| 14 | " | " | " | As in (13) + TNF/MeOH | " | 63 | |
| 15 | " | " | 2 | 0 | 19 | 153 | |

TABLE 2-continued

Induced Photoconductivity in Cellulose[c] by γ-Irradiation Grafting of N-vinylcarbazole and derivatives in Pyridine

| Run | Monomer | Conc (%) | Radiation Dose (Mrad) | Additive[a] | Graft (%) | Photocond. Dark Current Ratio | Image |
|-----|---------|----------|----------------------|-------------|-----------|-------------------------------|-------|
| 16 | " | " | " | As in (15) + 5NA/Benzene | " | 35 | NOT TESTED |
| 17 | Monobromovinyl-carbazole | 20 | 0 | 0 | 22 | 33 | |
| 18 | " | " | " | As in (17) + TNF/Benzene (10% MeOH) | " | 55 | |
| 19 | " | " | 1 | 0 | 12 | 34 | |
| 20 | " | " | " | As in (19) + TNF/MeOH | " | 37 | |

[a]TNF = 2,4,7-trinitrofluorenone 5NA = 5-nitroascenaphthene.
[b]This means that sample (1) was dipped into an almost saturated solution of TNF in methanol and air dried.
[c]Whatman 41 paper.

NOTES:
1. Inclusion of TNF to form the charge-transfer complex gives a red coloured paper with significant photo/dark current ratios but no imaging.
2. 5NA gives similar effect but a yellow colour.
3. Inclusion of acid lowers photoconductivity.
4. Bromoderivatives have higher photoconductivities but brown paper.

TABLE 3

Induced Photoconductivity in Cellulose (Whatman 41) by Irradiation Grafting of 4-Vinylpyridine (36% Graft)

| Run | Treatment[a] | Photoconductivity[b] Dark Current Ratio | Image |
|-----|--------------|----------------------------------------|-------|
| 1 | NHO$_3$(0.1N) | 13.3 | 0 |
| 2 | HClO$_4$ (0.1N) | 10.6 | 0 |
| 3 | CdCl$_2$ (0.1N) | 6.4 | Not tested |
| 4 | CdCl$_2$ HCl (0.1N each) | 180 | |
| 5 | HCl (0.1N) | 18 | 0 |
| 6 | H$_2$SO$_4$ (0.1N) | 10 | 0 |
| 7 | TNF/Benzene (10% MeOH) | 9.2 | 0 |
| 8 | 5NA/Benzene (10% MeOH) | 10.2 | 0 |

[a]FNF, 5NA defined in Table 2
[b]Pure (no graft) Whatman 41 with CdCl$_2$ (0.1N) gave ratio of 31; with CdCl$_2$/HCl (0.1N each), ratio was 35

TABLE 4

Effect of Acid and CdCl$_2$ on Induced Photoconductivity on Irradiation Grafted Vinylcarbazole-Cellulose[c] Copolymers

| Run | Conc. of VR[a] | Radiation Dose (Mrad) | Graft | Treatment | Photoconductivity Dark Current Ratio | Image |
|-----|----------------|----------------------|-------|-----------|--------------------------------------|-------|
| 1 | 10 | 1 | 9.8 | CdCl$_2$/HCl (0.1N each) | 300 | Yes-Q[b] |
| 2 | " | 2.5 | 11.3 | CdCl$_2$/HCl (0.1N each) | 50 | 0 |
| 3 | 20 | 1 | 20.2 | CdCl$_2$/HCl (0.1N each) | 1000 | Yes |
| 4 | " | 1.5 | 24.1 | CdCl$_2$/HCl (0.1N each) | 2000 | Yes |

[a]Grafting in presence of 0.1M H$_2$SO$_4$
[b]Yes-Q means weak image obtained; Yes - Strong Image.
[c]Whatman 41 paper.

NOTES:
1. Imaging obtained with samples 1, 3 and 4 thus suggesting that a ratio of 300 for photo/dark current is at least needed for imaging.

TABLE 5

Induced Photoconductivity in Cellulose (Whatman 41) by U.V. Cured Cellulose Copolymers

| Run | Monomer System[a] | Grafting Solvent | After Grafting Treatment | Graft % | Photoconductive Dark Current Ratio | Image |
|-----|-------------------|------------------|--------------------------|---------|-----------------------------------|-------|
| 1 | VK/4VP/SR351 | 0 | 0 | 115 | 25;60[b] | 0 |
| 2 | VK/4VP/SR444 | 0 | 0 | 85 | 40;25 | 0 |
| 3 | VK/4VP | 0 | HCl (0.1N) CdCl$_2$ (0.1N) | 75 | | Yes |
| 4 | VK/5NA | Pyridine | 0 | 75 | 10,000 | Yes |
| 5 | " | " | As in (8) + HCl (0.1N) | " | 10,000 | Yes |
| 6 | VK/EHA | 0 | 0 | 100 | 80 | 0 |
| 7 | " | 0 | As in (10) + HCl (0.1N) | 65 | 65 | 0 |
| 8 | VK/M-nitrostyrene | Pyridine | 0 | 35 | | Poor |
| 9 | VK/Ponitrostyrene | " | 0 | 60 | | Yes |
| 10 | VK/NMPM | 0 | 0 | 110 | | Yes |
| 11 | VK/NBM | 0 | 0 | 60 | | Yes |
| 12 | VK/TNF | Pyridine | 0 | 25 | | Poor |
| 13 | VK/anthracene | " | 0 | 30 | | Yes* |
| 14 | VK/4VP | 0 | 0 | 50 | | Yes |
| 15 | VK | Pyridine | 0 | 50 | | Yes |

[a]4VP = 4-vinylpyridine; SR numbers signify acrylates from Sartomer Chemical Co; VK = vinylcarbazole; 5NA = nitro-acenaphthene; EHA - 2 ethylhexylacrylate; NMPM = nitromethyl-propylmethacrylate; NBM = 2-nitro-1-butyl-methacrylate; TMF = 2,4,7-trinitrofluorenone;
[b]Second figure denotes under acid conditions.

NOTES:
1. 4VP alone does not give imaging under the listed conditions.
2. The presence of acrylates generally reduces both the photoconductivity and imaging properties of VK.
3. The presence of 5NA under VK leads to large photoconductivity/dark current ratios.
4. P-nitrostyrene is also a good comonomer with VK for the imaging property.
5. Run 17 * indicates the best imaging obtained.
6. Acid reduces both graft and photoconductivity.

TABLE 6

Effect of Paper Type No. of Coats & % Graft on Induced Photoconductivity in Cellulose (Allied 6 Bond) by U. V. Cured Copolymerisation with Vinylcarbazole

| Run | Monomer System | Grafting Solvent | No. of Polymer Coats | Graft | Photocond./Dark Current Ratio | Image |
|---|---|---|---|---|---|---|
| 1 | VK/Anthracene (1:1) | Benzene | one | 26 | 140 | Yes |
| 2 | VK/Anthracene (3:1) | " | two | 22 | 30 | 0 |
| 3 | VK/ | Pyridine | two | 33 | 50 | 0 |
| 4 | VK | Benzene | one | 28 | 100 | Yes |
| 5 | VK | Pyridine | two | 33 | — | Faint |
| 6 | " | " | two | 31 | — | * |
| 7 | " | " | two | 21 | — | " |
| 8 | " | " | two | 24 | — | " |
| 9 | " | " | two | 61 | — | " |
| 10 | " | " | one | 14 | — | Yes[5] |
| 11 | " | " | one | 10 | — | Yes[5] |
| 12 | " | " | one | 39 | — | Yes[5] |
| 13 | " | " | one | 37 | — | Yes[5] |
| 14 | " | " | two | 68 | — | 0 |
| 15 | " | " | Three | 101 | — | 0 |
| 16 | " | " | one | 49 | — | Yes |
| 17 | " | " | three | 128 | — | 0 |
| 18 | " | " | two | 78 | — | 0 |
| 19 | " | " | three | 102 | — | 0 |
| 20 | VK/SR444 (1:2) | " | three | 113 | — | 0 |

Notes:
1. More than one coat seems to eliminate (almost) imaging and drastically reduces photoconductivity.
2. Benzene or pyridine is satisfactory as solvent.
3. Acrylates (SR444) eliminates imaging as comonomers under the present conditions.
4. Imaging at 10% graft, but 20% gives better; upper limit seems to be 50%.
5. Order is 13 = 12 slightly better than 10 = 11 slightly better than 16.

CONCLUSIONS FROM TABLES

It would appear that N-vinylcarbazole has the best all round properties of the polymer forming monomers studied for appearance of film, photoconductivity/dark current ratio and imaging. The bromoderivatives are also useful, but they tend to discolour during grafting presumably due to the release of bromine. UV appears to be more efficient, economical and flexible than γ-radiation or thermal process for the grafting reaction. Electron accelerators would also be convenient but, again probably less economical than UV.

For imaging with UV and vinylcarbazole, a threshold graft of at least 8% is needed to get imaging although small percentages of graft do induce photoconduction in the support. For good imaging, grafts of 20–30% are required by UV. Above 40% care is needed since leakage can lead to loss of image. Since these are predominantly surface grafts, higher grafting than 30% is required to achieve imaging by the γ-irradiation process since the latter method yields grafting in the bulk as well as at the surface. The grafting in the bulk does not appear to make a large contribution to the "imaging" property although it does assist the photoconductivity/dark current ratio. Even with UV, grafts higher than 30% show a significant increase in photoconductivity/dark current ratios proportional to the degree of copolymerisation; however there appears to be no further improvement in imaging i.e. speed etc. At 30% graft, imaging is good with a reasonably fast response time.

The data show an approximate correlation between photoconductivity/dark current ratios and "imaging" in terms of threshold values. Thus with the UV technique it appears that a threshold value for the photoconductivity/dark current ratio of 100 at least is needed to achieve "imaging".

With the UV technique single coating only need be used to achieve imaging provided that the threshold amount of polymer is used. Curing of further coats on this initial coat leads to a lowering of photoconduction and loss of image.

We claim:

1. A method of rendering a surface of a substrate photoconductive comprising the steps of:
    (a) partially, but incompletely, polymerizing, by means of ultraviolet or ionizing radiation, one or more monomers selected from the group having the formula

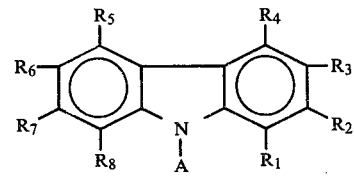

wherein A is a vinyl group, a hydrogen atom or an alkyl group containing up to 7 carbon atoms and R1, R2, R3, R4, R5, R6, R7, and R8 are each selected from the group consisting of a hydrogen atom, a halogen atom and a vinyl group, with the proviso that when A is a hydrogen atom or a lower alkyl group containing up to 7 carbon atoms, at least one of R1, R2, R3, R4, R5, R6, R7, R8 is a vinyl group;
    (b) applying to the surface of a substrate selected from the group consisting of a metal, a plastic and a cellulosic material a single layer of the partially polymerized material formed in step (a); and
    (c) completing polymerization in situ, by means of ultraviolet or ionizing radiation, of the material which was only partially polymerized in step (a).

2. A method as claimed in claim 1 in which the monomer of step (a) is N-vinylcarbazole.

3. A method as claimed in claim 1 in which the monomer or partially polymerized material of step (a) is mixed with another monomeric or polymeric material prior to being partially polymerised or applied to the surface of a substrate in step (b).

4. A method as claimed in claim 3 in which the other monomeric material is selected from the group consisting of an acrylate, a substituted acrylate, a methacrylate, a substituted methacrylate, a vinyl halide, a vinylidene halide, acrylonitrile, acrylic acid, an olefin acetate, vinylpyridine, styrene, a substituted styrene, isoprene, an olefine, a vinyl ether, a vinyl naphthalene, acrolein, an alkyl isothiocyanate, a vinyl silane, acrylamide, dimethacrylamide, divinyl benzene and allylamine.

5. A method as claimed in claim 1 in which the monomer or partially polymerized material of step (a) is mixed with a material selected from the group consisting of polycyclic aromatic hydrocarbons, 2,4, 7-trinitro-9-flurenone, mineral acids and soluble salts of cadmium, mercury and zinc.

6. A method as claimed in claim 1 which the monomer or partially polymerized material layer is of such a thickness that the polymerised layer has a thickness of from 0.02 to 0.5 thousandths of an inch.

7. A method as claimed in claim 1 in which the substrate is paper and in which the monomer or partially polymerized material layer is such that an amount of polymer of from 2 to 25% of the weight of the paper is adhered to the paper.

* * * * *